United States Patent
Seki et al.

(10) Patent No.: US 6,667,964 B1
(45) Date of Patent: Dec. 23, 2003

(54) PROPAGATION PATH-ESTIMATION METHOD FOR AN INTERFERENCE CANCELER AND INTERFERENCE ELIMINATION APPARATUS

(75) Inventors: Hiroyuki Seki, Kawasaki (JP); Yoshinori Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/312,169

(22) Filed: May 14, 1999

(30) Foreign Application Priority Data

Sep. 4, 1998 (JP) ............................. 10-251034

(51) Int. Cl.[7] .................... H04B 7/216; H04B 1/707
(52) U.S. Cl. ................. 370/342; 370/442; 370/332; 375/148; 375/144
(58) Field of Search ............................. 370/342, 442, 370/479, 332, 320, 335, 280, 337, 344, 347; 375/148, 144, 349, 206, 200

(56) References Cited

U.S. PATENT DOCUMENTS

| | | | | |
|---|---|---|---|---|
| 5,953,369 A | * | 9/1999 | Suzuki ........................ | 375/148 |
| 6,032,026 A | * | 2/2000 | Seki et al. .................. | 455/63.1 |
| 6,081,516 A | * | 6/2000 | Yoshida et al. ............. | 370/342 |
| 6,137,788 A | * | 10/2000 | Sawahashi et al. ......... | 370/342 |
| 6,157,685 A | * | 12/2000 | Tanaka et al. ............... | 375/148 |
| 6,192,067 B1 | * | 2/2001 | Toda et al. .................. | 375/144 |
| 6,304,624 B1 | * | 10/2001 | Seki et al. .................. | 375/130 |
| 6,363,103 B1 | * | 3/2002 | Buehrer et al. ............. | 375/148 |

* cited by examiner

Primary Examiner—Nay Maung
Assistant Examiner—John J Lee
(74) Attorney, Agent, or Firm—Katten Muchin Zavis Rosenman

(57) ABSTRACT

The present invention relates to a multi-stage type interference canceler applied to a DS-CDMA mobile communication and to an interference elimination apparatus. An object of the present invention is to improve the propagation path estimation accuracy without increasing the processing delay when employing parallel pilot channel system. In a multi-stage interference canceler, interference canceler units of each stage and a receiver of a final stage are connected in series. A signal modulated by a spreading code is received, and the parallel pilot channel system is employed to estimate the characteristic of the propagation path. Interference replicas are generated and subtracted from the received signal, so as to eliminate the interference. A propagation path estimation value estimated by the inference canceler unit of each stage is provided to the interference canceler unit of another stage via a signal line. The interference canceler unit of each stage calculates the propagation path estimation value using the propagation path estimation value estimated in its own stage and the propagation path estimation value notified from another stage.

10 Claims, 10 Drawing Sheets

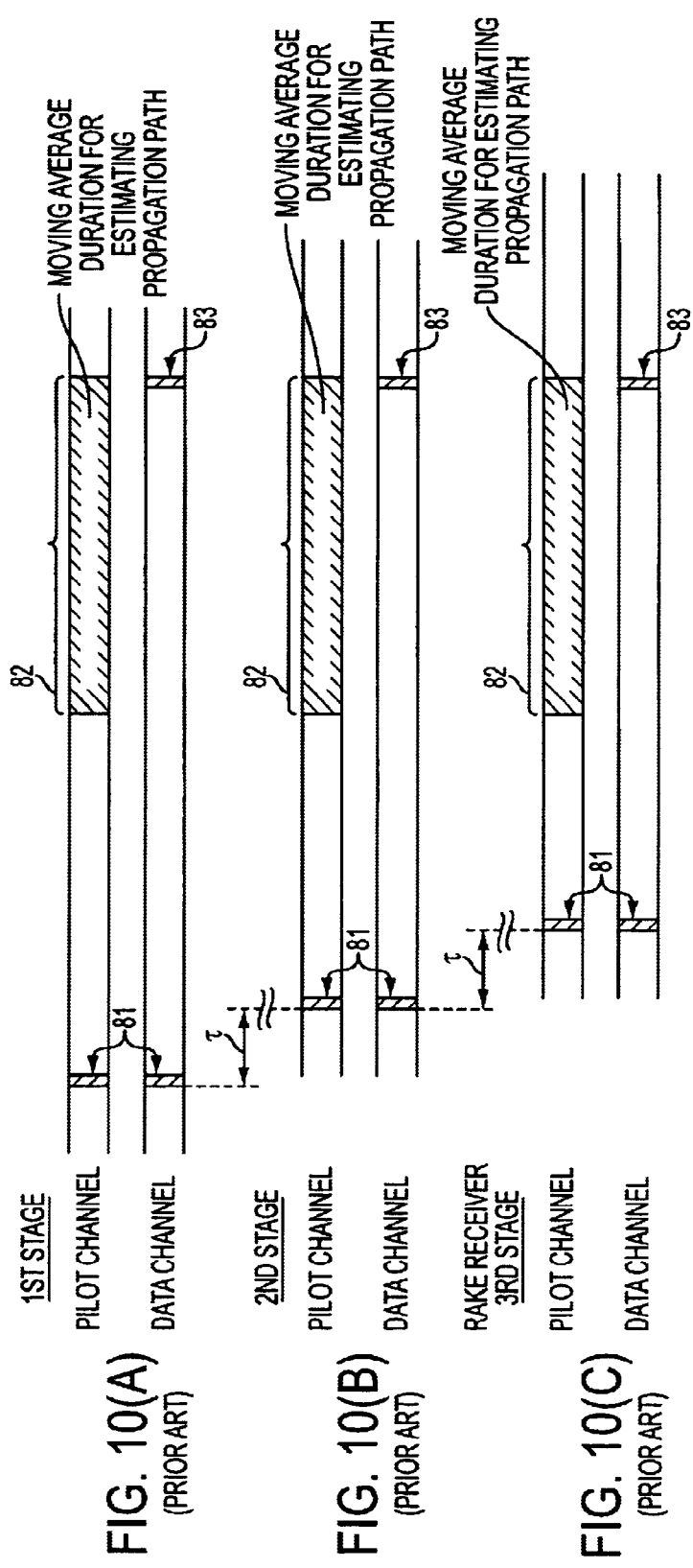

PROPAGATION PATH-ESTIMATION METHOD FOR AN INTERFERENCE CANCELER AND INTERFERENCE ELIMINATION APPARATUS

BACKGROUND OF THE INVENTION

The present invention generally relates to propagation path estimation methods for a multi-stage type interference canceler applied to a DS-CDMA mobile communication and to interference elimination apparatuses, and more particularly to a propagation path estimation method for a multi-stage type interference canceler that eliminates interference by estimating a characteristic of a propagation path using a pilot symbol transmitted in a channel different from a data channel and subtracting a generated interference replica from a received signal, and to an interference elimination apparatus that eliminates the interference in such a manner.

In a DS-CDMA (Direct Sequence Code Division Multiple Access) mobile communication system, interference caused by multipath from other mobile stations (other user channels) is generated due to the cross correlation among spreading codes introduced by asynchronization between the mobile stations. Such interference causes the transmission quality and the channel capacity of the mobile communication system to deteriorate. For this reason, there is a need to realize an interference canceler, which can eliminate the interference from the received signal with satisfactory accuracy and to improve the signal-power-to-interference-power ratio (SIR).

FIG. 6 shows a diagram showing a conventional multi-stage type interference canceler. Each stage of the multi-stage type interference canceler includes interference canceler units (ICU) 51 and a combining unit ($\Sigma$) 52. As can be seen, such stages are successively connected in series. FIG. 6 shows a case which the multi-stage type interference canceler includes a first stage 84, second stage 86, through mth stage 88. Further, data symbol receivers 53 are included in the final mth stage 88.

The interference canceler units 51 and the receivers 53 of the final stage are provided in parallel in correspondence with user channels. Subscripts to designations $ICU_{1,l}$–$ICU_{1,k}$, $ICU_{2,l}$–$ICU_{2,k}$, ... of the interference canceler units 51 indicate the stage number and the user number corresponding to the user channel. Similarly, subscripts to designations $ReC_{m,l}$ through $ReC_{m,k}$ of the receivers 53 indicate the stage number and the user number corresponding to the user channel.

In the first stage 84, a received signal Ro is input to each of the interference canceler units $ICU_{1,l}$–$ICU_{1,k}$ corresponding to the user channels. The interference canceler units $ICU_{1,l}$–$ICU_{1,k}$ respectively output symbol replica signals $S_{1,l}$–$S_{1,k}$ and interference replica signals $d_{1,l}$–$d_{1,k}$. The combining unit 52 combines the interference replica signals $d_{1,l}$–$d_{1,k}$ corresponding to the user channels to obtain a combined signal, and then outputs an error signal el of the first stage 84 by subtracting the combined signal from the received signal Ro.

In the second stage 86, the error signal $e_1$ from the combining unit 52 of the first stage 84 and the symbol replica signals $S_{1,l}$–$S_{1,k}$ from the interference canceler units $ICU_{1,l}$–$ICU_{1,k}$ of the first stage are respectively input to the interference canceler units $ICU_{2,l}$–$ICU_{2,k}$. The interference canceler units $ICU_{2,l}$–$ICU_{2,k}$ respectively output symbol replica signals $S_{2,l}$–$S_{2,k}$ and interference replica signals $d_{2,l}$–$d_{2,k}$. The combining unit 52 combines the interference replica signals $d_{2,l}$–$d_{2,k}$ corresponding to the user channels to obtain a combined signal, and then outputs an error signal $e_2$ of the second stage 86 by subtracting the combined signal from the error signal el of the first stage 84.

In the final mth stage 88, an error signal $e_{m-1}$ of a preceding (m–1)th stage and symbol replica signals $Sm_{-1,l}$–$Sm_{-1,k}$ from the preceding (m–1)th stage are respectively input to the receivers $ReC_{m,l}$–$ReC_{m,k}$. The receivers $ReC_{m,l}$–$ReC_{m,k}$ then eliminate the interference from these input signals so as to decode the data symbol. By successively repeating the interference elimination process at each of the stages, the error signals gradually become smaller. Therefore, it is possible to obtain symbol replica signals without interference among the users or the like.

FIG. 7 is a diagram showing a conventional interference canceler unit. The interference canceler unit (ICU) 51 includes despreading processors 61, a combining unit 62, a decision unit 63, spreading processors 64, and a combining unit 65. The despreading processors 61 each include a despreader 61-1, an adder 61-2, a multiplier 61-3 and a propagation path estimation circuit 61-4. The spreading processors 64 each include a multiplier 64-1, an adder 64-2 and a respreader 64-3.

The number of despreading processors 61 and spreading processors 64 respectively correspond to the number of received delayed waves, that is, the number of the paths (propagation paths) to be multiplexed. FIG. 7 shows a case where three despreading processors 61 and three spreading processors 64 are provided in parallel. In FIG. 7, a subscript i (in this example, i=1 to 3) indicates the signals corresponding to the different paths. The signals corresponding to the different paths are often referred to as RAKE fingers.

An error signal $e_{j-1}$ from a preceding stage (the received signal Ro in the case of a first stage) and symbol replica signals $S_{j-1,l}$–$S_{j-1,k}$ of the preceding stage (zero in the case of the first state) are input to the despreading processor 61, where j denotes the stage number. The despreader 61-1 carries out a despreading and demodulation with respect to the error signal $e_{j-1}$ of the preceding stage (the received signal Ro in the case of the first stage) using a spreading code.

The despread and demodulated signal, and one symbol replica signals $S_{j-1,l}$–$S_{j-1,k}$ of the preceding state (zero in the case of the first stage) are combined by the adder 61-2 to produce a received symbol Ri. The received symbol Ri is then input to the propagation path estimation circuit 61-4. The propagation path estimation circuit 61-4 estimates the characteristic of the corresponding propagation path using a pilot symbol shown in FIG. 7 and then outputs a propagation path estimation value $\xi i\hat{}$ for each path.

By multiplying a complex conjugate $\xi_i\hat{}^*$ of the propagation path estimation value $\xi_i\hat{}$ to the signal Ri in the multiplier 61-3, a received symbol is produced, which is eliminated of a phase error caused by the effects of the propagation path.

The output signals of the multipliers 61-3 for each of the paths are subjected to a diversity composing in the combining unit ($\Sigma$) 62. A diversity combined received symbol $\Sigma R_i \xi_i\hat{}^*$ is compared with a threshold value in the decision unit 63, where a data symbol is provisionally decided.

The signals generated and output from the despreading processors 61 will be referred to as replica generation signals. The replica generation signals are converted into symbol replica signals and interference replica signals in the spreading processors 64, which are then transmitted to the next stage.

A provisionally decided data symbol $Z\hat{s}$ output from the decision unit 63 is branched in correspondence with the different paths. Further, the propagation path estimation value $\hat{\xi}_i$ is multiplied by the multiplier 64-1 of each of the spreading processors 64. Therefore, the provisionally decided data symbol $Z\hat{s}$ is again decomposed into the signals corresponding to the channels, and transmitted to the next stage as symbol replica signals $S_{j,l}$–$S_{j,k}$.

In addition, the symbol replica signals $S_{j,l}$–$S_{j,k}$ corresponding to each path are output from the multiplier 64-1 and one of the symbol replica signals $S_{j-1,l}$–$S_{j-1,k}$ from the preceding stage are input to the adder 64-2. The adder 64-2 outputs the difference between one of the symbol replica signals $S_{j,l}$–$S_{j,k}$ of this stage and one of the symbol replica signals $S_{j-1,l}$–$S_{j-1,k}$ of the preceding stage. The output signal of the adder 64-2 is then spread by the respreader 64-3 using the spreading code. A spread output signal from the respreader 64-3 is combined with spread output signals from the respreaders 64-3 of the other paths in the combining unit 65. A combined output from the combining unit 65 is then transmitted to another such as the second combining unit 52 shown in FIG. 6, as interference replica signals $d_{j,l}$–$d_{j,k}$.

In FIG. 8, the receiver unit 53 of the final stage is shown. The receiver 53 includes the despreading processors 61, the combining unit 62 and the decision unit 63. Symbol replica signals $S_{m-1,l}$–$S_{m-1,k}$ and an error signal em–1 from an interference replica generation unit of the preceding stage are input to the despreading processors 61 of the receiver 53 in the final stage. The despreading processors 61 in the receiver 53 of the final stage carry out a process similar to that of the despreading processor of the interference canceler unit described above, and outputs a demodulated symbol.

The combining unit 62 of the receiver 53 in the final stage carries out diversity combining with respect to the demodulated symbols output from the despreading processors 61. Further, the decision unit 63 makes a final decision with respect to a diversity demodulated symbol $\Sigma R_i \hat{\xi}_i^*$, and reproduces it as information data. This data is then output to a decoder Ro, where decoding process such as deinterleaving and error correction is performed.

Accordingly, the received signal is subjected to a despreading process for each delayed wave (path) in the despreading processor 61 of the receiver in the final stages of the interference replica generation unit for each stage corresponding to each user channel. Further, a signal corresponding to each path is converted into a symbol rate.

The propagation path estimation circuit 61-4 estimates the characteristic (fading complex envelope) of each path using the pilot symbol. The propagation path estimation circuit also multiplies the complex conjugate to detect the received data by generating the data symbol in which the effects of the propagation path is eliminated.

Further, a description will be given of the estimation of the propagation path using the pilot symbol. Generally, in mobile communications, the propagation path characteristic changes due to the fading as a communication terminal moves in an environment where multipaths are produced.

In a case where the data symbol is received and demodulated in such an environment, a generally employed technique receives and demodulates the pilot symbol transmitted along with the data symbol. Further, this technique estimates the propagation path characteristic (fading complex envelope) from the pilot symbol and coherently detects the data symbol by eliminating the effects of the propagation path.

The pilot symbol is a known symbol having a predetermined amplitude and phase. The pilot symbol is either inserted between data symbols being transmitted or is transmitted in a channel different from the data symbol channel.

In the case where the pilot symbol is inserted between the data symbols, the pilot symbol is inserted at a predetermined position in the data frame and is then transmitted. At a receiving unit, a synchronization is performed using a preamble or the like added in front of the data frame, so as to recognize the pilot symbol position. The symbol at this position is demodulated, and then a propagation path characteristic is estimated from the values of the amplitude and phase of the demodulated pilot symbol.

On the other hand, in the case where the pilot symbol is transmitted in a channel different from the data symbol channel, the pilot symbol and the data symbol are multiplexed and then transmitted in mutually orthogonal channels. Because the pilot symbol is transmitted in parallel with the data symbol, this method is referred to as a parallel pilot channel system. Since the parallel pilot channel system includes multiplexing and demultiplexing using an orthogonal code, studies are being made for application to mobile communications using the DS-CDMA.

For the sake of convenience, the symbol transmitted as the pilot symbol will be denoted by Z. In this case, if the propagation path characteristic id denoted by $\xi$, the received symbol becomes $Z\xi$. The predetermined amplitude and phase of the pilot symbol Z is known. Therefore, when a complex conjugate $Z^*$ of the known pilot symbol Z is multiplied with the received symbol $Z\xi$, which is received via the propagation path, the product takes a value $\xi |Z|^2$.

Because the magnitude of the pilot symbol vector is known ($|Z|$ may be assumed to be 1), the propagation path characteristic $\xi$ can be estimated by a calculation. The propagation path estimation circuit 61-4 carries out this calculation and outputs the propagation path estimation value $\hat{\xi}$. The propagation path estimation value $\hat{\xi}$ is described by the following formula (1).

$$\hat{\xi} = Z\xi \cdot Z^* = \xi \cdot |Z|^2 \qquad (1)$$

Since the received symbol is actually affected by noise and interference, it is difficult to accurately estimate the propagation path characteristic. Accordingly, propagation path characteristics obtained from a plurality of pilot symbols are averaged, so as to improve the accuracy of the estimation. Generally, in order to follow the change in the propagation path with time due to fading, a moving average is obtained from among a plurality of pilot symbols in a moving duration.

A propagation path characteristic estimated from an average of a plurality of pilot symbols before and after a nth pilot symbol will be denoted by $\hat{\xi}_n$. If the nth transmitted data symbol is denoted by $Z_n$ and the actual propagation path is denoted by $\xi_n$, the received data symbol becomes $Z_n \cdot \xi_n$. Thus, by multiplying the complex conjugate $\hat{\xi}_n^*$ of the propagation path estimation value by the received data symbol $Z_n \cdot \xi_n$ and dividing the product by a square of the absolute value of the vector of the propagation path estimation value $\hat{\xi}_n$, it is possible to demodulate from the received data symbol $Z_n \cdot \xi_n$, the transmitted data symbol $Z_n$ from which the effects of the propagation path are eliminated. A demodulated data symbol $\hat{Z}_n$, which is obtained in the above described manner is described by the following formula (2).

$$\hat{Z}_n = Z_n \cdot \xi_n \cdot \hat{\xi}_n^* / |\hat{\xi}_n|^2 \qquad (2)$$

The date symbols obtained by the coherent detection described above are subjected to the diversity combining in the combining unit 62, and then the decision unit 63 decides the phase thereof. In addition, in the case of a multi-level QAM or the like, the decision unit 63 also decides the amplitude thereof.

In the spreading processor 64, the propagation path estimation value $\hat{\xi}$ described above is multiplied to the symbols, which are decided in the decision unit 63. The symbols are then branched to the corresponding paths again before respreading is performed. As a result, symbol replica signals and interference replica signals are generated which are transmitted to the next stage. In the next stage, a process similar to that described above is carried out, and is then repeated in the subsequent stages, so that the interference is gradually eliminated.

Although, only one signal line is illustrated in FIG. 7, a bus structure is actually used. In other words, the data symbol and the pilot symbol are multiplexed and then transmitted.

FIG. 9 shows a timing relationship of the propagation path estimation using the pilot symbol and the demodulated data symbol. As shown in FIG. 9, the pilot symbol and the data symbol are respectively transmitted in a pilot channel 71 and a data channel 72, which are independent.

In this case, the data symbol and the pilot symbol are spread and multiplexed using independent codes, and modulated by the same carrier. For this reason, the two channels are received after being subjected to the effects of the same propagation path. At the receiving end, the despreading is carried out using the respective codes, so as to separate the data symbol and the pilot symbol.

In order to reduce the effects of the interference and noise, the propagation path estimation value used for the demodulation process is obtained by averaging the propagation path estimation values using the pilot symbols in a predetermined duration 73, as shown in FIG. 9. In addition, the moving average is obtained in a state where the predetermined duration 73 is maintained, so as to follow the change in the propagation path due to fading.

The moving average duration 73 is determined within a range such that the propagation path characteristic does not change greatly. As shown in FIG. 9, in order to avoid a processing delay, the propagation path estimation is made from the moving average of the pilot symbols before the data symbol is demodulated, and a demodulated data symbol 74 is subjected to the coherent detection using the propagation path estimation value.

FIG. 10 shows a timing relationship of the propagation path estimation in each stage of a multi-stage type interference canceler and the demodulated data symbol In FIG. 10, the timing relationship of a frame header symbol 81, a moving average duration 82 for estimating the propagation path, and a demodulated data symbol 83 is shown in (A) with respect to the first stage, in (B) with respect to the second state and in (C) with respect to the third stage.

Between the stages, an inter-stage processing delay time $\tau$ on the order of approximately several symbols occurs. This inter-stage processing delay time $\tau$ is introduced by the delay adjustment for carrying out the RAKE combining (diversity combining), the input/output delay when transferring the data between the stages, and the like.

The reception characteristic of the pilot coherent detection is greatly affected by the estimation accuracy of the propagation path. Particularly in the case of the multi-stage type interference canceler, the propagation path estimation value is not only used for the RAKE combining in order to make the provisional decision, but also for generating the interference replicas. Thus, the propagation path estimation value greatly affects the interference elimination characteristic. Accordingly, in a DS-CDMA mobile communication, it is important to improve the estimation accuracy of the propagation path, in order to improve the reception characteristic and cell capacity.

As a method of improving the estimation accuracy of the propagation path, it is conceivable to also use the pilot symbol after the data symbol is demodulated. However, this method would increase the processing delay at each stage. Particularly in the case of an interference canceler having a large number of stages, the processing delay is a multiple of the number of stages, which introduces problems thereby. On the other hand, in the DS-CDMA mobile communication if a transmission power control is carried out, the reception characteristic further deteriorates because the increase in the processing delay causes a delay of the transmission power control.

SUMMARY OF THE INVENTION

Therefore, an object of the present invention, is to improve the estimation accuracy of the propagation path in a multi-stage type interference canceler applied to a DS-CDMA mobile communication, without increasing the processing delay when making a coherent detection in the parallel pilot channel system.

These and other objects are met in accordance with the present invention directed to a propagation path estimation method for estimating a characteristic of a propagation path using a pilot symbol. The pilot symbol is transmitted in a channel different from a data symbol channel in a multi-stage type interference canceler that receives a signal modulated by a spreading code. The method according to the present invention includes notifying a propagation path estimation value estimated at each stage of the interference canceler to another stage. The method further includes calculating the propagation path estimation value of each stage by using the propagation path estimation value estimated at each stage and the propagation path estimation value notified from another stage.

The propagation path estimation method according to the present invention also includes notifying the propagation path estimation value estimated at a latter stage to a preceding stage, and calculating the propagation path estimation value at the preceding stage using the propagation path estimation value estimated at each stage and the propagation path estimation value notified from the latter stage.

In the multi-stage type interference canceler, the estimation accuracy of the propagation path improves at the latter stages because the interference is further eliminated in the latter stages. Hence, by using the propagation path estimation value estimated at the latter stage in the preceding stage, it becomes possible to improve the estimation accuracy of the propagation path at the preceding stage.

A propagation path estimation method according to the present invention includes notifying a propagation path estimation value previously estimated in a preceding stage to a latter stage, and calculating the propagation path estimation value at the latter stage using the propagation path estimation value estimated at each stage and the propagation path estimation value notified from the preceding stage.

Since a processing delay on the order of approximately several symbols occurs between the stages, the latter stage carries out a demodulation process with respect to the symbol, which is input several symbols before as compared to the symbol presently input to the preceding stage. Accordingly, the propagation path estimation value at a time position after a symbol presently input to the latter stage is already estimated at the preceding stage. Hence, by using the propagation path estimation value already estimated at the preceding stage, it is possible to improve the estimation accuracy of the propagation path at the latter stage.

A propagation path estimation method according to the present invention includes calculating a propagation path estimation value from a weighted average of the propagation path estimation value estimated at each stage and the propagation path estimation value notified from another stage, depending on a reliability of each stage.

A multi-stage type interference elimination apparatus according to the present invention eliminates interference of a signal modulated by a spreading code. The apparatus includes an interference canceler unit at each stage and a receiver at a final stage, which are coupled in series. A propagation path estimation circuitry is provided in both the interference canceler unit of each stage and the receiver at the final stage. The propagation path estimation circuit estimates a characteristic of a propagation path using a pilot symbol transmitted in a channel different from a data symbol channel. The propagation path estimation circuit further notifies a propagation path estimation value estimated at each stage to another stage via a signal line, and at each stage calculates the propagation path estimation value using the propagation path estimation value estimated in its own stage and the propagation path estimation value provides from another stage. An interference elimination apparatus according to the present invention is configured so that the propagation path estimation circuit notifies the propagation path estimation value estimated at a latter stage to the preceding stage. Further, the propagation path estimation circuit at the preceding stage calculates the propagation path estimation value using the propagation path estimation value estimated in its own stage and the propagation path estimation value notified from the latter stage.

An interference elimination apparatus according to the present invention is constructed so that the propagation path estimation circuit provides a propagation path estimation value previously estimated in a preceding stage to the latter stage. Further, the propagation path estimation circuit at the latter stage calculates the propagation path estimation value using the propagation path estimation value estimated in its own stage and the propagation path estimation value from the preceding stage.

An interference elimination apparatus according to the present invention is configured so that the propagation path estimation circuit calculates a propagation path estimation value from a weighted average of the propagation path estimation value of each stage and the propagation path estimation value from another stage, depending on a reliability of each stage.

BRIEF DESCRIPTION OF THE DRAWINGS

FIG. 10 is a diagram showing a timing relationship of the propagation path estimation in each stage of the multi-stage type interference canceler and the demodulated data symbol.

FORMS OF REALIZING THE INVENTION

Figure 1:
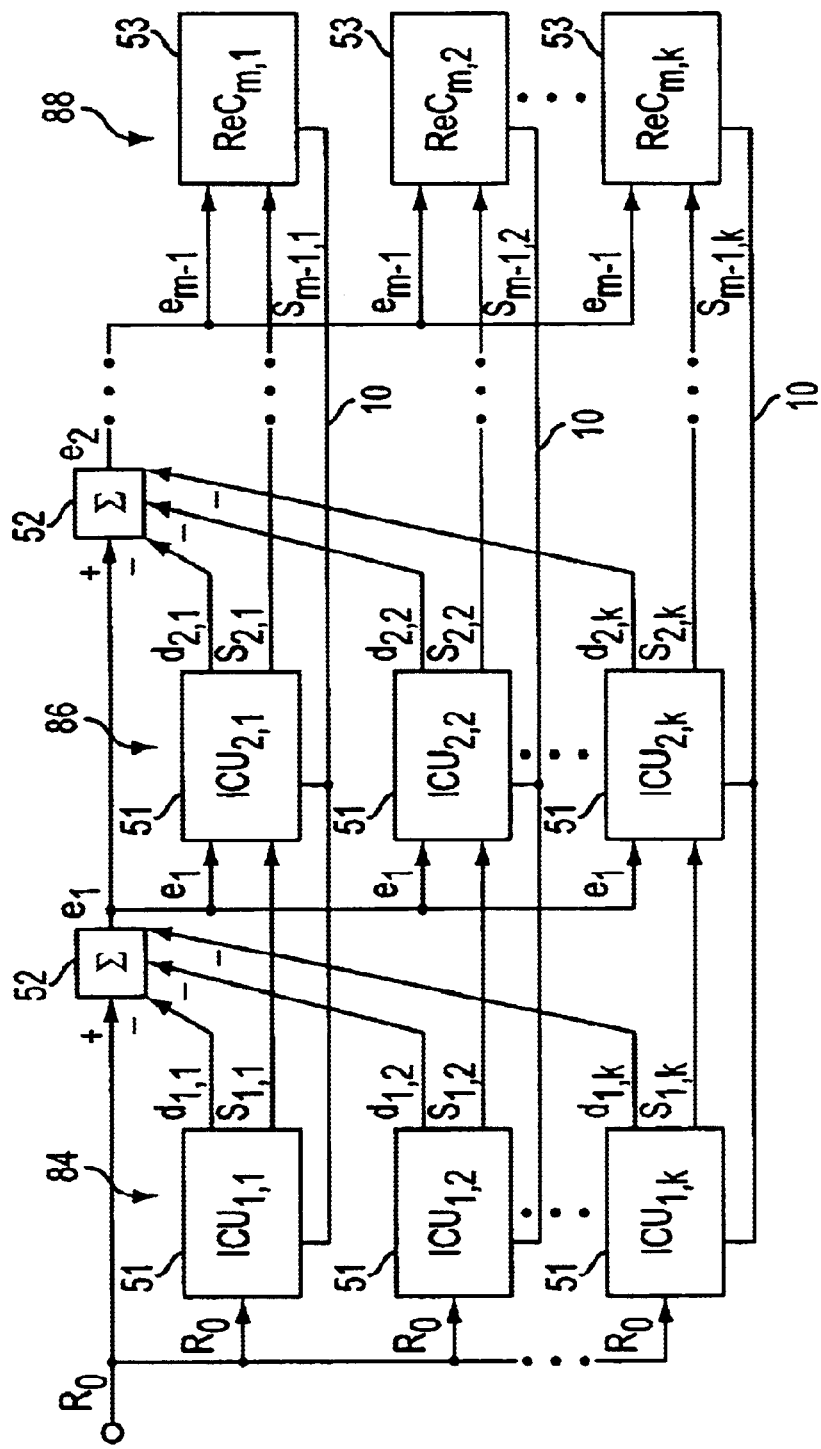
FIG. 1 is a diagram showing a multi-stage type interference canceler according to the present invention.
Figure 6:
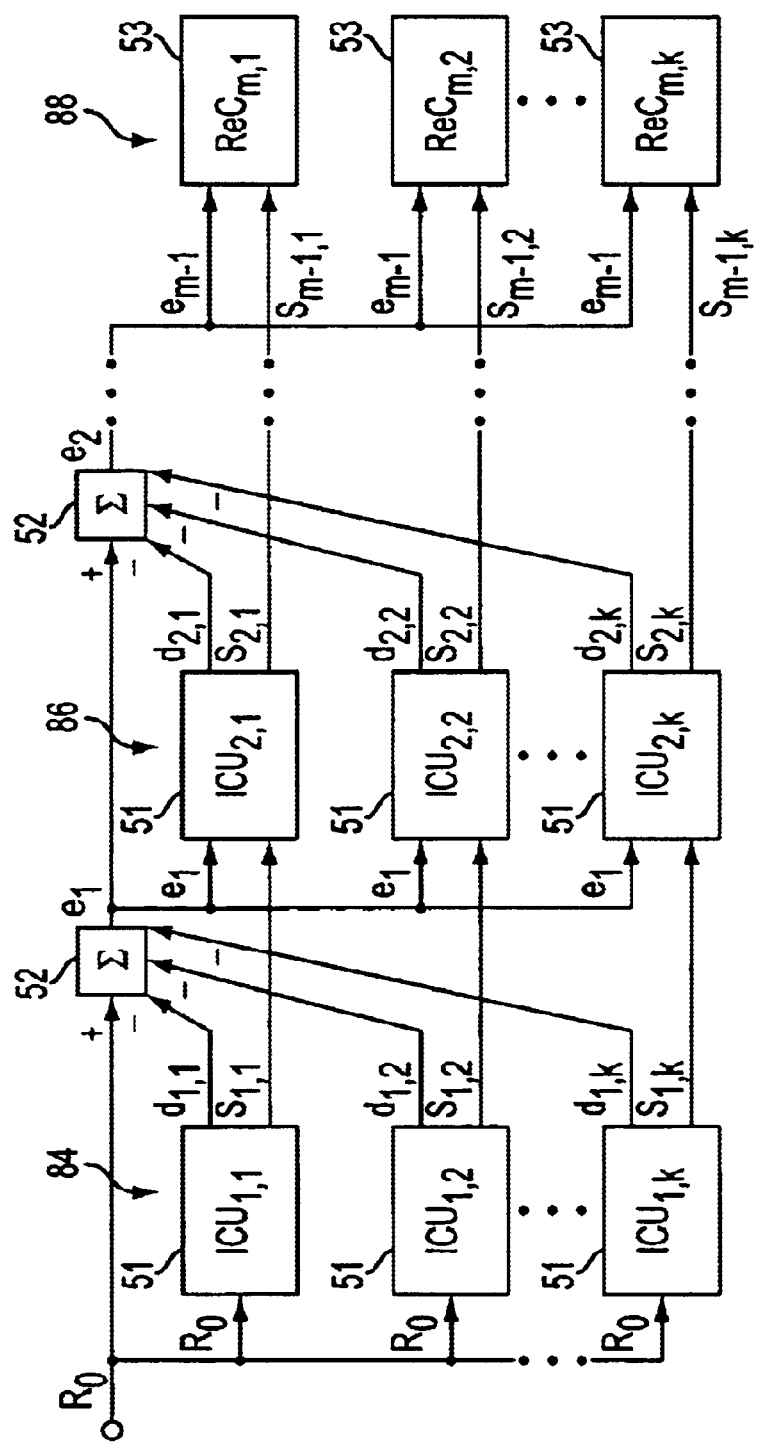
FIG. 6 is a diagram showing a conventional multi-stage type interference canceler.

FIG. 1 shows a multi-stage type interference canceler according to the present invention. The basic structures and ftmctions of the interference canceler units (ICU) 51, the combining units (Σ) 52 and the receiver (ReC) 53 at the final stage are similar to those of the conventional multi-stage type interference canceler shown in FIG. 6, and a description of the same structures and functions of these elements will be omitted.

In the multi-stage type interference canceler according to the present invention, the interference canceler units 51 of each of the stages 84, 86 and the propagation path estimation circuit in the receiver of the final stage 88 are coupled via a signal line 10, with respect to each of the user channels, so that propagation path estimation information can be transferred and exchanged between the stages 84, 86, 88.

Figure 2:
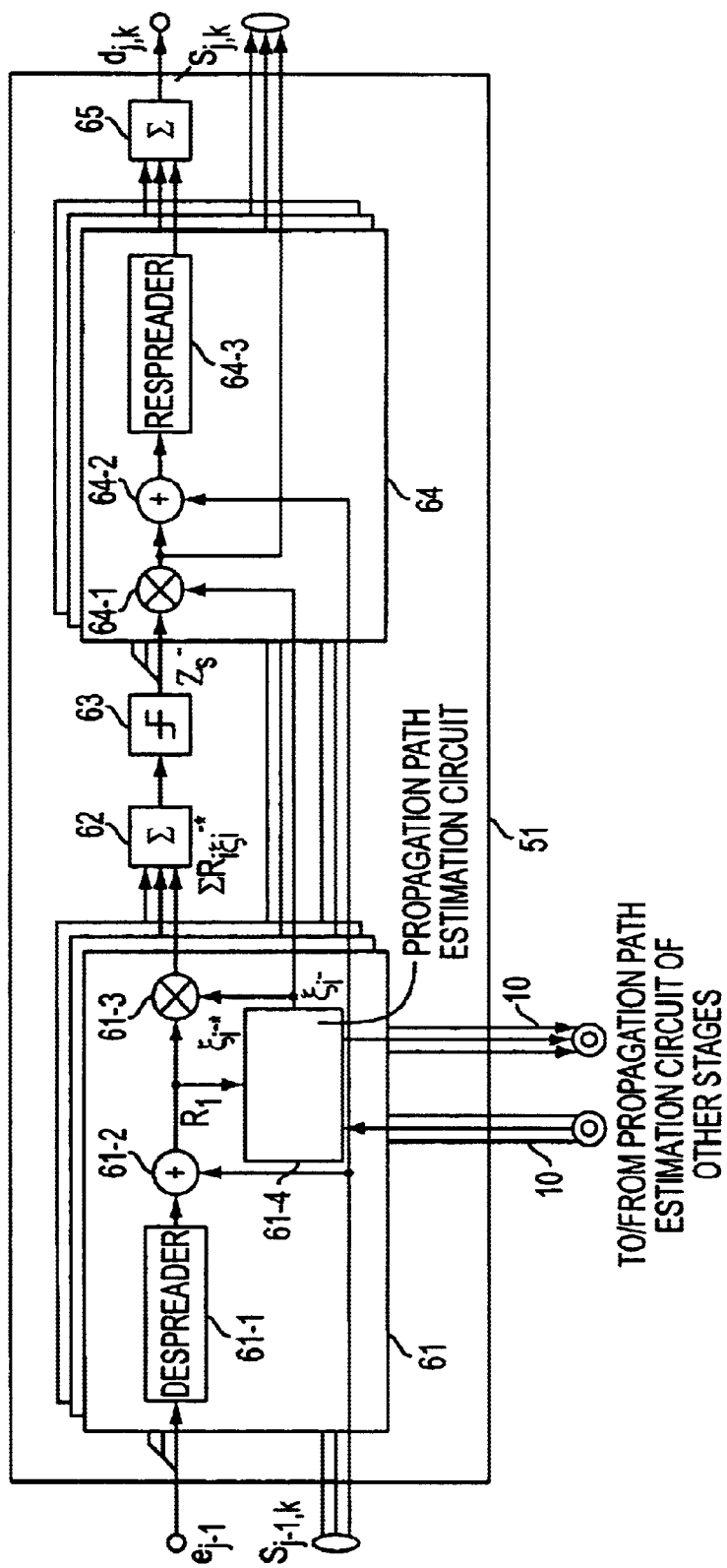
FIG. 2 is a diagram showing an interference canceler unit according to the present invention.
Figure 7:
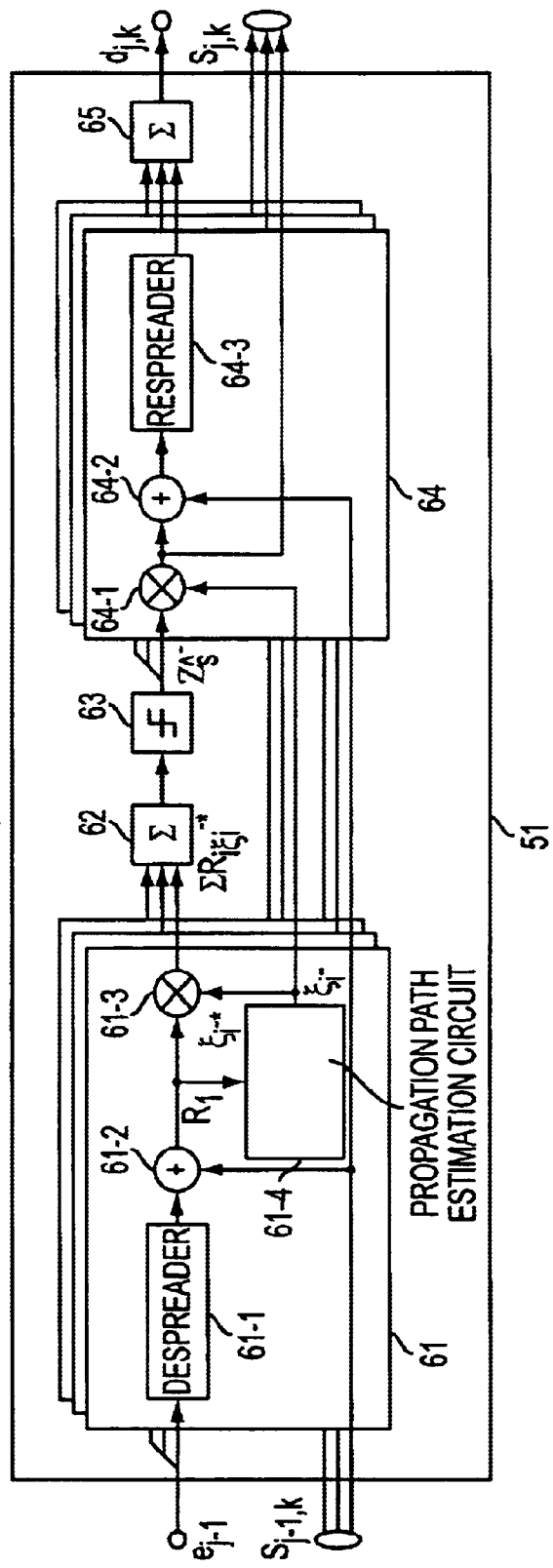
FIG. 7 is a diagram showing a conventional interference canceler unit.

FIG. 2 is a diagram showing an interference canceler unit 51 according to the present invention. An interference canceler unit (ICU) 51 includes despreading processors 61, a combining unit 62, a decision unit 63, spreading processors 64, and a combining unit 65. The despreading processor 61 includes a despreader 61-1, an adder 61-2, a multiplier 61-3, and a propagation path estimation circuit 61-4. The spreading processor 64 includes a multiplier 64-1, an adder 64-2 and a respreader 64-3. The basic structures and functions of the elements shown in FIG. 2 are similar to those of the conventional interference canceler unit shown in FIG. 7, and a description of the same structures and ftnctions of these elements will be omitted.

In the interference canceler unit 51 of the present invention, the propagation path estimation circuit 61-4 are coupled to the propagation path estimation circuits 61-4 of the other stages via the signal line 10. In other words, the interference canceler unit 51 is configured so that the propagation path estimation information can be transferred and exchanged between the stages.

In the multi-stage type interference canceler, the estimation accuracy of the propagation path improves at the latter stages because the interference is further eliminated towards the latter stages. Hence, by using the propagation path estimation value estimated at the latter stage in the preceding stage, it becomes possible to improve the estimation accuracy of the propagation path at the preceding stage.

Figure 3:
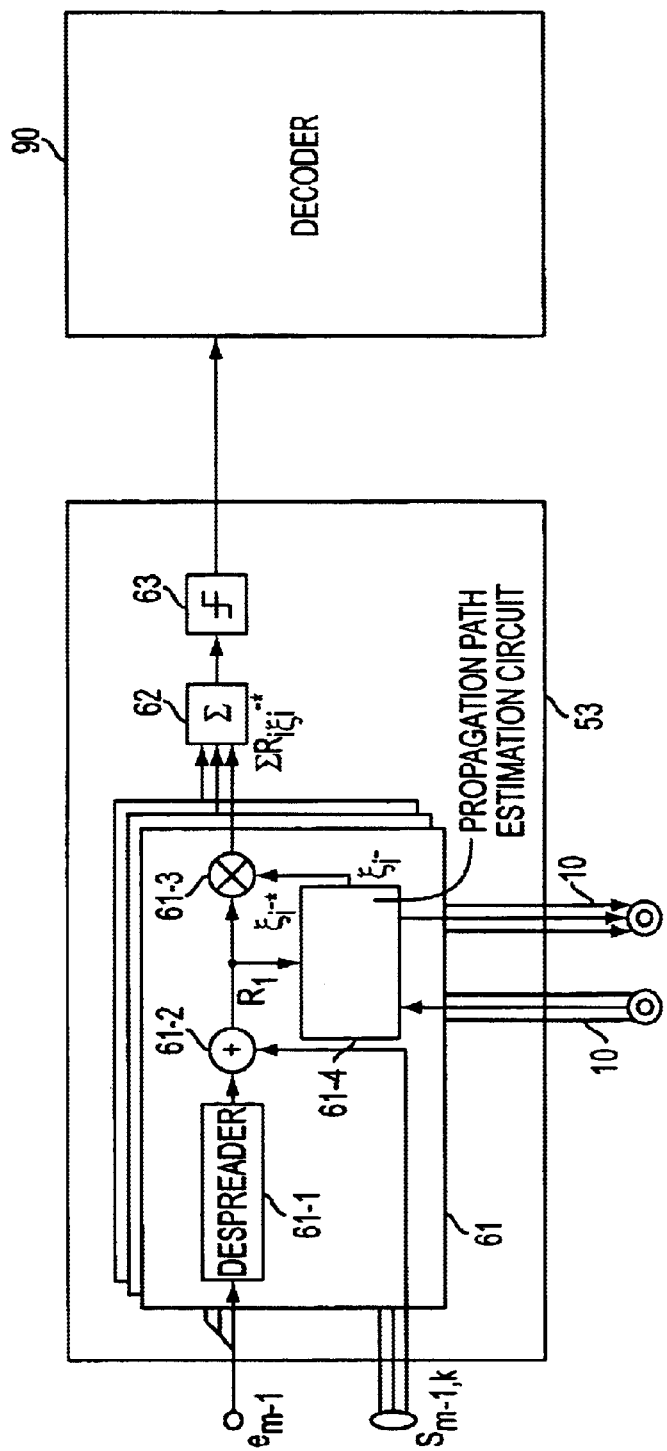
FIG. 3 is a diagram showing a receiver unit according to the present invention.
Figure 8:
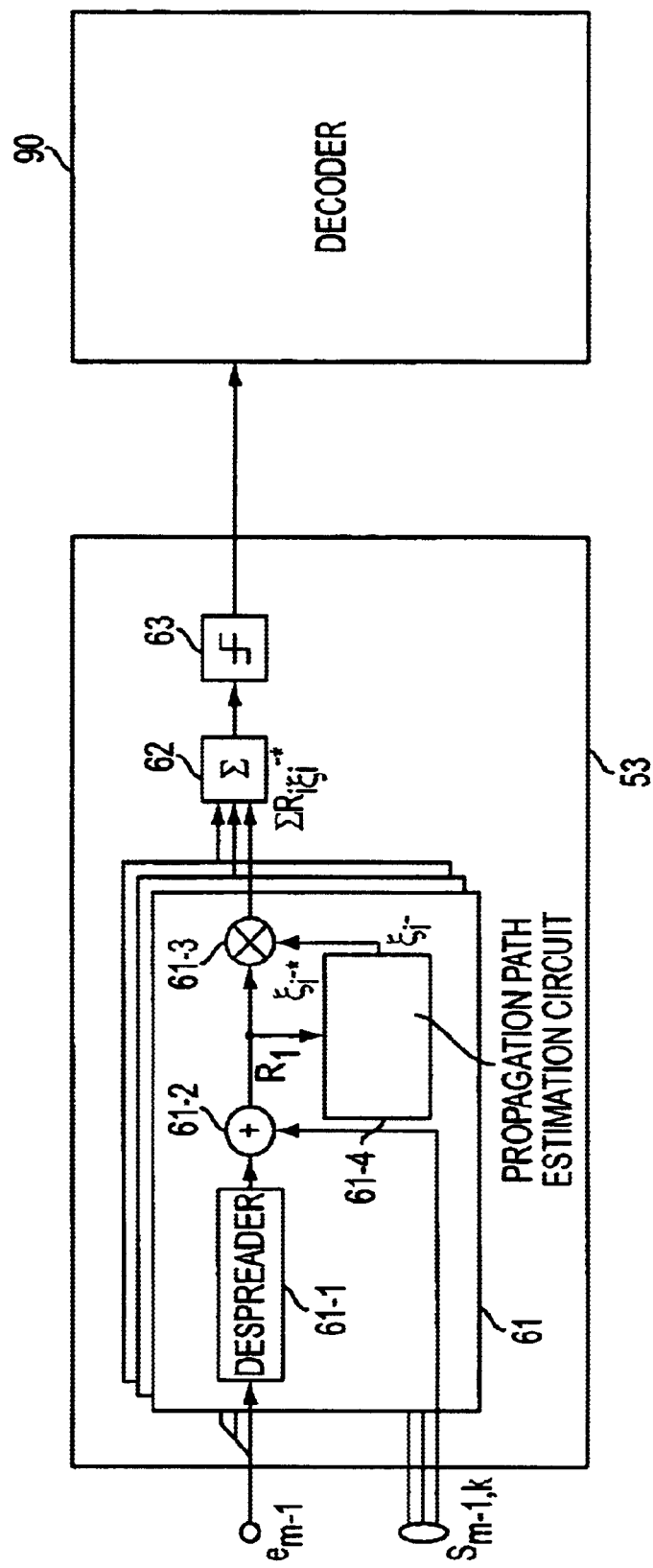
FIG. 8 is a diagram showing a conventional receiver unit.
Figure 9:
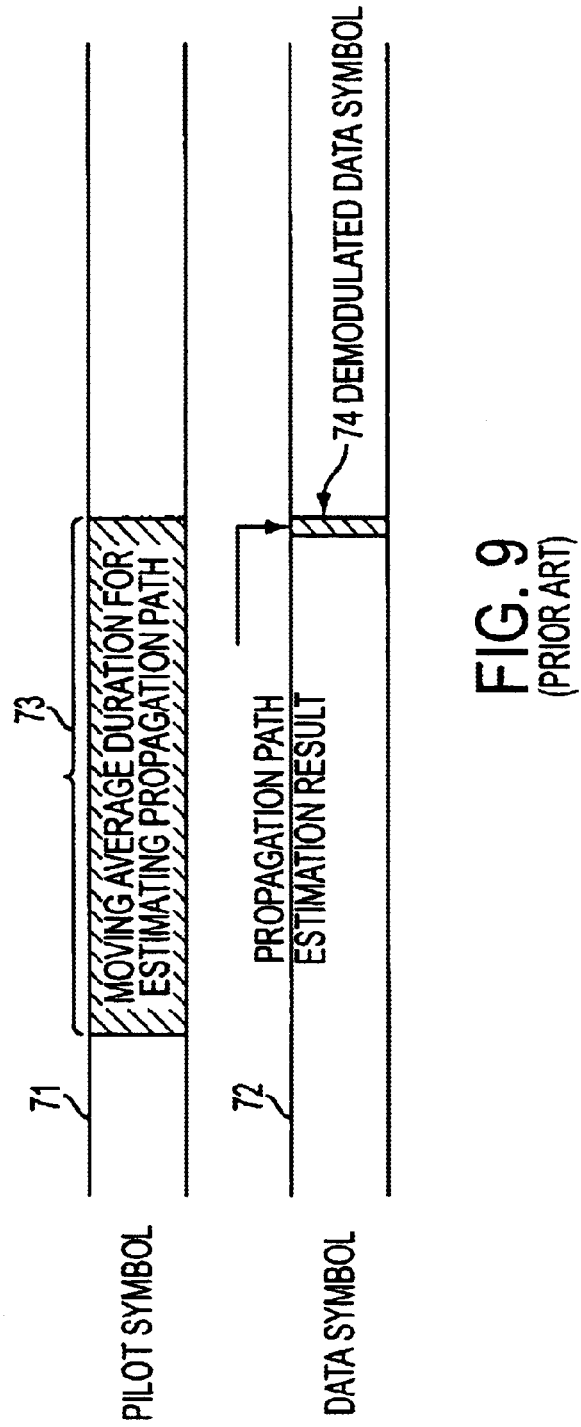
FIG. 9 is a diagram showing a timing relationship of the propagation path estimation using the pilot symbol and the demodulated data symbol.

According to the present invention, the final stage 88 includes receiver 53 similar to the conventional receiver of FIG. 8. However, as can be seen from FIG. 3, the receiver 53 of the present invention differ in that propagation path estimation circuits are configured to include signal lines similar to FIG. 2. This enables propagation exchange between the last stage 88 and the preceding stage, as shown in FIG. 1.

Figure 4:
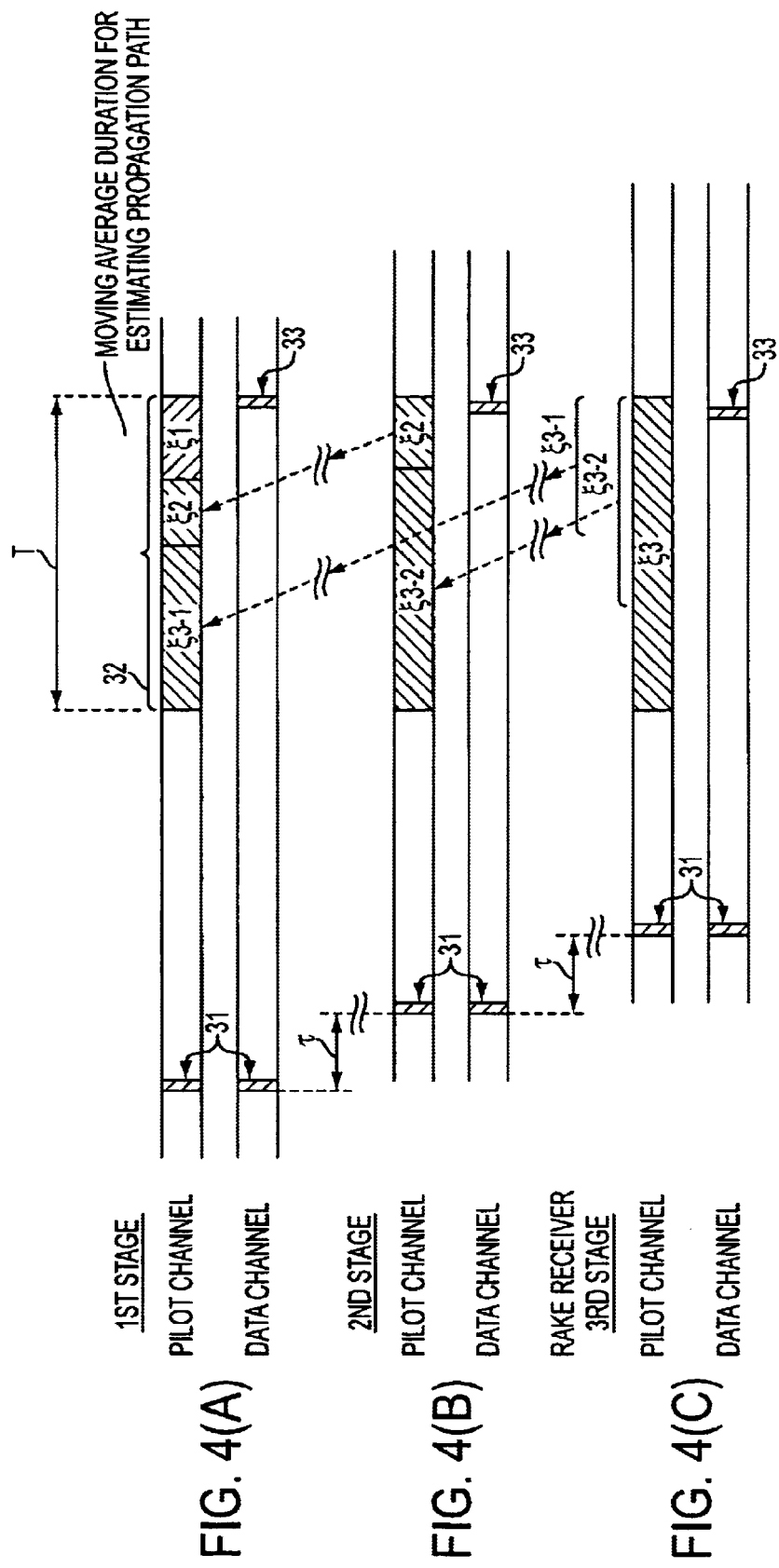
FIG. 4 is a diagram showing a timing relationship of the propagation path estimation in each stage of a first embodiment of the present invention and the demodulated data symbol.

FIG. 4 shows a timing relationship of the propagation path estimation in each stage of a first embodiment of the multi-stage type interference canceler and the demodulated data symbol. In FIG. 4, the timing relationship of a frame header symbol 31, a moving average duration 32 for estimating the propagation path, and a demodulated data symbol 33 is shown in (A) with respect to the first stage, in (B) with resect to the second stage, and in (C) with respect to the third stage.

Between the stages, an inter-stage processing delay time τ on the order of approximately several symbols occurs. As described above, this inter-stage processing delay time τ is introduced by the delay adjustment for carrying out the RAKE combining (diversity combining), the input/output delay due to transferring the data between the stages, and the like. The moving average duration 32 for estimating the propagation path is the same at each stage, and has a timer interval T conforming to the fading period. Further, the moving average duration is sufficiently long compared to the inter-stage processing delay time τ.

In each of the first, second and third stages, the propagation path is estimated using the pilot symbol, which is received by the propagation path estimation circuit 64-1 of each stage. Propagation path estimation values obtained at the first, second and third stages will respectively be denoted by $\xi_1$, $\xi_2$, and $\xi_3$.

As described above, the estimation accuracy of the propagation path improves towards the latter stages. Thus, by transferring the propagation path estimation value estimated at the latter stage to the preceding stage, it becomes possible to improve the accuracy of the propagation path estimation values from the preceding stage. This is accomplished by including propagation estimation values from the latter stage in the moving average duration 32 for estimating the propagation path and, then taking the moving average.

In the first stage, the propagation path estimation value 41 estimated using the pilot symbol of its own stage is used during the inter-stage processing delay time τ. In addition, the propagation path estimation value $\xi_2$ already obtained in the second stage is used as the propagation path estimation value at the position prior to the propagation path estimation value 41, during the inter-stage processing delay time τ. Furthermore, the propagation path estimation value $\xi_3$ already obtained in the third stage is used in a remaining duration of the moving average duration 32 and is then subjected to a moving average. Thus, the propagation path estimation value $\xi_3$ is used as the propagation path estimation value at the position prior to the propagation path estimation value $\xi_2$. As a result, it is possible to carry out the coherent detection of the demodulated data symbol 33 based on a highly accurate propagation path estimation value.

In this case, a propagation path estimation value $\xi_{3-1}$ at a time position closer to the demodulated data symbol 33 is used as the propagation path estimation value $\xi_3$, which is used in the remaining duration of the moving average duration 32 of the first stage.

In the second stage, the propagation path estimation value $\xi_2$ estimated using the pilot symbol of its own stage is used only during the inter-stage processing delay time τ. In addition, the propagation estimation value $\xi_3$ is already obtained in the third state is used in a remaining duration of the moving average duration 32 and is subjected to a moving average, to be used as the propagation path estimation value at the position prior to the propagation path estimation value $\xi_2$. As a result, it is possible to carry out the coherent detection of the demodulated data symbol 33 based on a highly accurate propagation path estimation value.

In this case, a propagation path estimation value $\xi_{3-2}$ at a time position closer to the demodulated data symbol 33 is used as the propagation path estimation value 43, which is used in the remaining duration of the moving average duration 32 of the second stage. Further, in the final third stage, a moving average is obtained based on the propagation path estimation value $\xi_3$, which is estimated in its own stage and has the highest accuracy. Thus, the coherent detection of the demodulated data symbol 33 is carried out based on the propagation path estimation value having a higher accuracy.

In this first embodiment described heretofore, the propagation path estimation value of the latter stage is transferred to the preceding stage to improve the accuracy of the demodulated data symbol and the propagation path estimation value of the preceding stage. However, it is also possible to transfer the propagation path estimation value of the preceding stage to the latter stage, so as to improve the propagation path estimation value of the latter stage. A description will hereinafter be given of a second embodiment of the present invention which employs such an arrangement.

Since a processing delay on the order of approximately several symbols occurs between the stages, the latter stage carries out a demodulation process with respect to the symbol input several symbols before as compared to the symbol presently input to the preceding stage. Accordingly, it may be regarded that the propagation path estimation value at a time position after the symbol presently input to the latter stage is already estimated at the preceding state. Thus, by using the propagation path estimation value already estimated the preceding stage, it is possible to improve the estimation accuracy of the propagation path at the latter stage.

Figure 5:
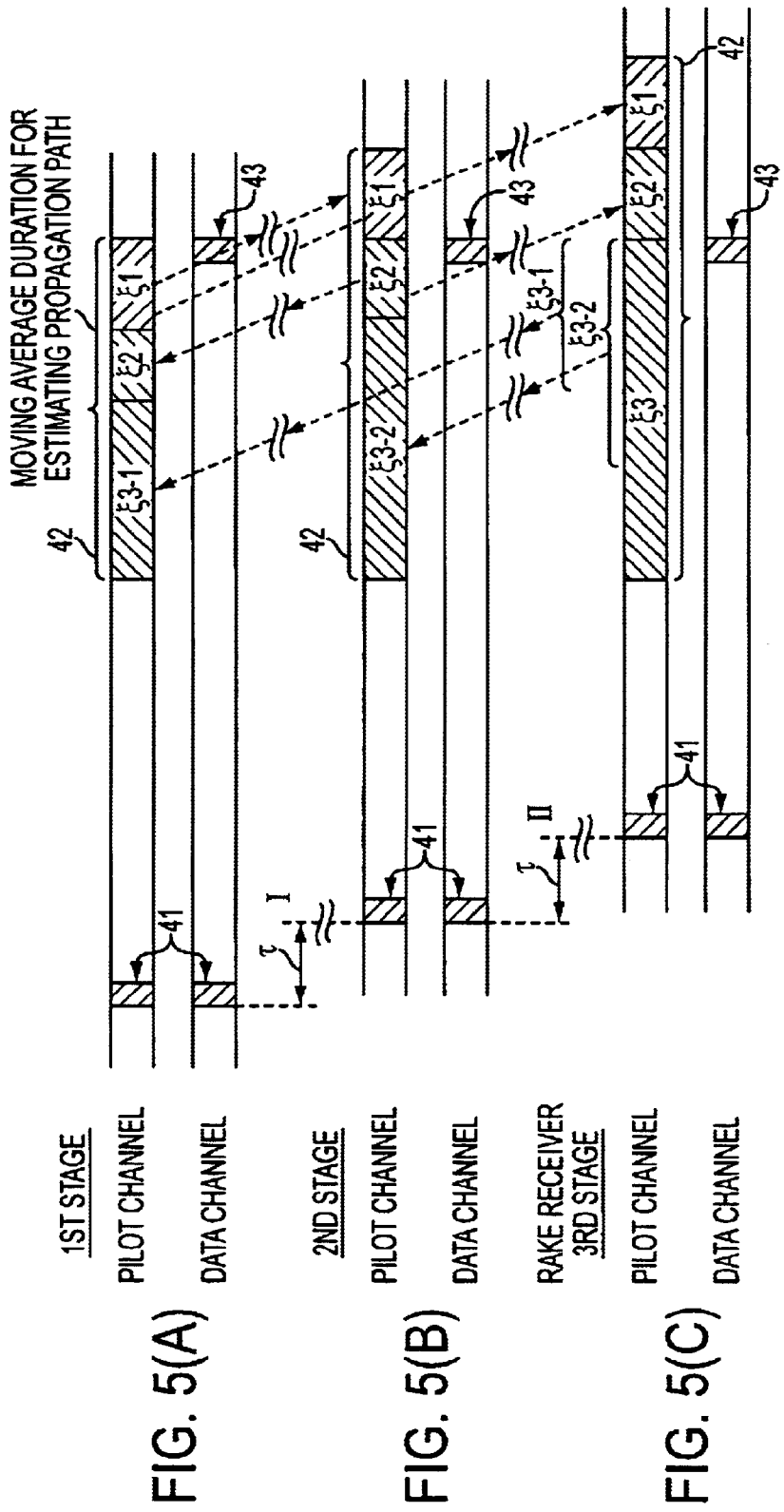
FIG. 5 is a diagram showing a timing relationship of the propagation path estimation in each stage of a second embodiment of the present invention and the demodulated data symbol.

FIG. 5 shows a timing relationship of the propagation path estimation in each stage of the second embodiment of the multi-stage type interference canceler and the demodulated data symbol. In FIG. 5, the timing relationship of a frame header symbol 41, a moving average duration 42 for estimating the propagation path, and a demodulated data symbol 43 is shown in (A) with respect to the first stage, in (B) with respect to the second stage, and in (C) with respect to the third stage.

Similarly to the first embodiment, FIG. 5 shows a case where the propagation path estimation value of the latter stage is transferred to the preceding stage, and in addition, the propagation path estimation value of the preceding stage is transferred to the latter stage.

In the second stage, when carrying out a demodulation process with respect to the data symbol, the propagation path estimation value $\xi_1$ is ahead by a number of symbols corresponding to the inter-stage processing delay time τ and is already estimated by the propagation path estimation circuit of the first stage.

Accordingly, the propagation path estimation circuit of the second stage receives the propagation path estimation value $\xi_1$ from the propagation path estimation circuit of the first stage via the signal line, and obtains a moving average using the propagation path estimation value $\xi_1$ of the first stage, the propagation path estimation value $\xi_2$ of the second stage and the propagation path estimation value $\xi_3$ of the third stage. The coherent detection of the demodulated data symbol 43 is carried out based on the propagation path estimation value, which is obtained from the moving average.

As described above, the propagation path estimation value of the preceding stage generally has an accuracy lower than that of the propagation path estimation value of the latter stage. However, by taking the moving average of the propagation path estimation values at time positions before and after the data symbol to be subjected to the demodulation process, it is possible to improve the accuracy of the propagation path estimation value at the time of the data symbol demodulation.

In other words, generally, the average value of the moving average duration is in most cases a value close to the propagation path estimation value at an intermediate position of the moving average duration. For this reason, by obtaining an average using the propagation path estimation values at the time positions before and after the demodulated data symbol, the averaging is carried out in the moving average duration about a center position, which is the time of the data symbol demodulation. Consequently, the accuracy of the propagation path estimation value is improved particularly when fading greatly changes.

Similarly, in the third stage, the propagation path estimation value $\xi_2$ estimated in the second stage and the propagation path estimation value $\xi_1$ estimated in the first stage are used as the propagation path estimation values. Thus, the accuracy of the propagation path estimation value is improved by obtaining an average value of these propagation path estimation values and the propagation path estimation value $\xi_3$ of the third stage. In the third stage, the demodulated symbol 43 is located at a position closer to the center of the moving average duration 42 which is made up of the propagation path estimation values $\xi_1$, $\xi_2$ and $\xi_3$. Therefore, the accuracy of the propagation path estimation value is further improved.

By transferring the propagation path estimation value of the preceding stage to the latter stage, it is possible to carry out a highly accurate estimation of the propagation path. This is accomplished by taking an average in the moving average duration, which includes the propagation path estimation value after the demodulated data symbol, without increasing the processing delay of the demodulated data symbol. In FIG. 4, the duration in which the propagation path estimation values $\xi_1$ and $\xi_2$ of the first and second stages are used corresponds to the inter-stage processing delay time $\tau$.

In the first embodiment of the present invention, the propagation path information estimated in the other stages is input during the moving average duration for estimating the propagation path in its own stage and subjected to the moving average. However, it is possible to further improve the accuracy by obtaining a weighted average of the propagation path estimation value obtained in its own stage and the propagation path estimation values obtained in the other stages.

In this case, since the accuracy of the propagation path estimation values obtained in the respective stages are higher towards the latter stages, it is possible to improve the accuracy of the propagation path estimation value by increasing the weighting of the propagation path estimation values at the latter stages and carrying out the weighted averaging depending on the reliability of the propagation path estimation value. According to the present invention, the propagation path estimation value estimated at each stage of the interference canceler is provided to the other stages. Thus, each stage uses the propagation path estimation value notified from another stage. As a result, it is possible to obtain a highly accurate propagation path estimation value.

In addition, by transferring the more accurate propagation path estimation value estimated at the latter stage to the preceding stage, and taking the moving average at the preceding stage by inputting the propagation path estimation value of the latter stage, it is possible to improve the accuracy of the propagation path estimation value of the preceding stage.

Moreover, by transferring the propagation path estimation value of the preceding stage to the latter stage, it is possible to carry out a highly accurate estimation of the propagation path by taking a moving average including the propagation path estimation value after the demodulated data symbol, without increasing the processing delay of the demodulated data symbol.

Furthermore, by taking the weighted average of the propagation path estimation value obtained in its own stage and the propagation path estimation value obtained in another stage depending on the reliability of the propagation path estimation value, it is possible to further improve the accuracy of the propagation path estimation value.

What is claimed is:

1. An interference elimination apparatus for eliminating interference of a signal modulated by a spreading code, comprising:

a plurality of stages coupled in series, wherein a last stage of the plurality of stages includes at least one receiver unit and the other stages include at least one interference canceling unit;

propagation path estimation circuits included in each of the at least one interference canceling unit and the at least one receiver unit, wherein the propagation path estimation circuits calculate propagation estimation values; and a signal line interconnecting the propagation path estimation circuits of at least two of the plurality of stages in order to transfer propagation estimated values therebetween.

2. The apparatus of claim 1, wherein the propagation estimation values are calculated using a pilot symbol included in the signal modulated by the spreading code.

3. The apparatus of claim 2, wherein the pilot symbol is transmitted to the apparatus by a channel different from a data symbol channel.

4. The apparatus of claim 1, wherein the propagation estimated values are transferred via the signal line from the propagation path estimation circuits of each of the plurality of stages to the propagation path estimation circuits of a corresponding preceding stage.

5. The apparatus of claim 4, wherein the propagation path estimation circuits of the corresponding preceding stage calculate the propagation estimation values using propagation estimation values previously calculated in both the propagation path estimation circuits of the plurality of stages and the corresponding preceding stage.

6. The apparatus of claim 5, wherein the propagation estimation values are calculated from a weighted average of both the propagation estimation values previously calculated in the propagation path estimation circuits of each of the plurality of stages and the propagation path estimation circuits of the corresponding preceding stage based on reliability of the plurality of stages.

7. The apparatus of claim 1, wherein the propagation estimated values are transferred via the signal line from the propagation path estimation circuits of each of the plurality of stages to the propagation path estimation circuits of a corresponding subsequent stage.

8. The apparatus of claim 7, wherein the propagation path estimation circuits of the plurality of stages calculate the propagation estimation values using propagation estimation values previously calculated in both the propagation path estimation circuits of the plurality of stages and the propagation path estimation circuits of the corresponding subsequent stage.

9. The apparatus of claim 8, wherein the propagation estimation values are calculated from a weighted average of both the propagation estimation values previously calculated in the propagation path estimation circuits of each of the plurality of stages and the propagation path estimation circuits of the corresponding subsequent stage based on reliability of the plurality of stages.

10. An interference elimination apparatus for eliminating interference of a signal modulated by a spreading code, comprising:

a plurality of stages coupled in series, wherein a last stage of the plurality of stages includes at least one receiver unit and the other stages include at least one interference canceling unit;

propagation path estimation circuits included in each of the at least one interference canceling unit and the at least one receiver unit, wherein the propagation path estimation circuits calculate propagation estimation values; and a signal line interconnecting the propagation path estimation circuits of the plurality of stages in order to transfer propagation estimated values there between.

* * * * *